United States Patent Office 3,468,979
Patented Sept. 23, 1969

3,468,979
EPDM POLYMER BLEND WITH BUILDING TACK AND GREEN STRENGTH
Parviz Hamed, Akron, and Everett T. McDonel, Brecksville, Ohio, assignors to The B. F. Goodrich Company, New York, N.Y., a corporation of New York
No Drawing. Filed Jan. 17, 1968, Ser. No. 698,439
Int. Cl. C08f 37/00; C08g 37/00
U.S. Cl. 260—897      3 Claims

ABSTRACT OF THE DISCLOSURE

Synthetic rubber compositions with green strength and building tack are prepared by blending an EPDM polymer high in propylene (at least 55% by weight) and an EPDM polymer high in ethylene (at least 55% by weight). The tack level is further increased by compounding with carbon black and tackifying resins.

Background of the invention

The ethylene-propylene-diene terpolymers, known as EPDM rubbers, are highly saturated elastomers. Their high saturation makes them difficult to cure compatibly in sulfur cure with unsaturated rubbers, and when used either in combination with unsaturated rubbers, or alone, EPDM rubbers do not exhibit sufficient building tack and green strength to enable one to construct an article such as a pneumatic tire from them. Tack is the ability of an uncured polymer to adhere to itself on slight contact pressure and to resist separation afterwards. A surface adhering to other materials, as well as to itself, possesses stickiness, not tack. Good tack development in a polymer requires surface adhesion (a surface property) and cohesive strength (a bulk property). The cohesive strength portion of tack is referred to as green strength. One solution to this problem is to provide a tackifying cement of polymer in solvent which is brushed, dipped or sprayed onto the EPDM compound and dries to leave a tacky surface. Often it is not desired to use a tackifying cement, and manufacturers would like to have EPDM gum stocks or compounds that exhibit tack in the manner that natural rubber gum and compound does. It is particularly desirable to use EPDM polymers in constructing synthetic rubber articles because in addition to the many rubbery qualities these polymers possess, they have unusual resistance to ozone. Low resistance to ozone is a weak spot in the qualities of natural rubber and unsaturated synthetic rubbers such as SBR and polybutadiene which are widely used in pneumatic tire manufacture today.

Summary of the invention

This invention is based on the discovery that a blend of particular EPDM polymers exhibits increased green strength and building tack compared to the levels shown by any of the component polymers alone. Further, this degree of tack and green strength can be increased to levels which are completely satisfactory for such activities as making splices and stock turn ups in assembling parts to make a pneumatic tire by adding standard reinforcing and curing agents. Addition of the same materials to the individual polymers of the blend does not have any such effect.

Green strength is evaluated by milling a sheet of stock 0.075 inch thick. Test samples, 1″ x 0.075″ x 6″, are cut from these sheets and pulled at 20 inches per minute in an Instron tensile test machine. A continuous record is made of the strain elongation in percent and the stress applied in pounds which can be converted into pounds per square inch. The application of stress to produce strain is plotted to give a green strength curve. Elastomeric samples have yield points (the point on the stress-strain curve at which the stress-strain curve slopes downward as elongation increases) and break points (the point on the stress-strain curve at which the sample snaps apart). The unvulcanized elastomer is said to have good green strength when the break stress ($T_B$) is higher than the minimum yield stress ($T_Y$). In other words, $T_B-T_Y$ should be a positive number. Conversely an elastomer has poor green strength when yield stress decays directly into (is about equal to) the breaking stress or $T_B-T_Y$ is a negative quantity. Stocks with the best potential for tire building will have a $T_B-T_Y$ value of 1 to 100. If $T_B-T_Y$ is greater than 100, the green strength is so great that the stock is too tough to mill and compound. Another criterion of good green strength is that the elastomer must show at least 400% elongation at break. The stress analysis can be run on loaded or unloaded stocks. Loading or reinforcing pigments such as carbon black have no effect on the shape of the stress-strain curve, but they do move the entire curve up to a higher level of stress. Some stocks would be too weak to give a curve if they were not initially loaded, therefore in the study of this invention only loaded, unvulcanized elastomers have been considered.

In the art of compounding elastomeric materials, particularly for manufacture of pneumatic tires, tack is a singularly important property. The stock must have quick grab when plies are laid; repeat tack when plies are replaced or turned up; high strength tack when beads are seated. Furthermore, the stock must accommodate to long term low stress as when beads must be held tightly in storage of a green tire, and to short term high stress to hold splices during lifting of the green tire into the mold.

In spite of its importance to the tire building art, tack is not yet satisfactorily evaluated quantitatively. Many factors react simultaneously to give one skilled in the art on overall impression of tack. At this time, undesirable as it is, the hand tack test by an experienced person is the most reliable test available. In performing the "Quick Tack" test the evaluator takes two pieces of the test material 2″ x 6″ x 0.060″ approximately, reinforced with square woven fabric and touches them together lightly and rapidly over their entire area. The pieces must immediately adhere together with sufficient force to support their own weight when the assembly is held so that one piece is hanging down completely unsupported except by its "cling" to its mating piece. This material is rated "Good" if the lower piece does not peel away while supporting its own weight. It is rated "Poor" if the lower piece peels away in five minutes. Two similar pieces are lightly pressed together, held together for one second by their "cling" attraction, then pulled apart. The degree of pull is the measure of tack. A hard pull, at one inch per minute of approximately 25–40 p.s.i. is called "Good." An easy pull of 10–15 p.s.i. is rated "Poor." A material has to pass the "Quick Tack" evaluation in order to qualify for this "Hand Pull" evaluation. When a material has passed the "Hand Pull" evaluation, the test pieces are touched together again with light pressure over their entire areas and they must again adhere firmly as in the original "Quick Tack" evaluation. This step is called the "Repeat Tack" test.

Two types of EPDM polymers are used in the practice of this invention. The first type is a high propylene terpolymer of ethylene-propylene-diene monomer. This polymer has 55–67 weight percent propylene units in its structure, from about 3.0 to about 5.0 weight percent diene monomer and a dilute solution viscosity (DSV) of 1.2–1.8 based on 0.2 g./100 cc. toluene. From 70 to 25 parts per 100 parts of polymer blend is used.

The second polymer in the blend is a high ethylene terpolymer of ethylene-propylene-diene monomer. This polymer has 55–80 weight percent ethylene, from about 3.0 to about 5.0 weight percent diene monomer and DSV of 1.6–2.0. From 30 to 75 parts per 100 parts of polymer blend is used.

The high propylene and high ethylene polymers are blended by mill mixing or in a Banbury mixer or similar device. When reinforcing, softening and tackifying agents are added, the blended polymer compound develops a level of green strength and tack that is satisfactory for building pneumatic tires.

Detailed description of the invention

The EPDM polymers employed in the blends of this invention are prepared following the teachings of prior art patents noted below. These terpolymer rubbers are terpolymers of ethylene, propylene and a non-conjugated polyene. The polyene is usually a diene or a triene. The manufacture of these terpolymer rubbers is well-known to those skilled in the art. The polyenes are usually polyunsaturated monocyclic, bicyclic, tricyclic or acyclic hydrocarbons. In such terpolymers the non-conjugated polyene usually ranges from 0.5 to 15 percent of the weight of the terpolymer, and the ethylene-to-propylene weight ratio ranges from 20:80 to 80:20.

Examples of terpolymer rubbers which may be used in the stocks being blended are given in U.S. Patents 2,933,480, 3,000,866, 3,000,867, 3,063,973, 3,093,620, 3,093,621, 3,136,739, in British Patent 880,904, and in Belgian Patent 623,698. The polyenes most commonly used in such terpolymers in present commercial practice are dicyclopentadiene (more accurately termed cyclopentadiene dimer), 1,4-hexadiene, methylenenorbornene and 1,5-cyclooctadiene. Other polyenes which can be used include alloocimene, methyl cyclopentadiene dimer, etc. Terpolymers made with dicyclopentadiene are exemplified in U.S. 3,000,866 and 3,136,739 and in British Patent 880,904. The use of 1,4-hexadiene is exemplified in 2,933,480. The use of methylenenorbornene (actually 5-methylene-2-norbornene) is exemplified in U.S. 3,093,-621. The use of 1,5-cyclooctadiene is exemplified in Belgian Patent 623,698. Examples of such commercial terpolymers are those available under the trademarks Royalene, Nordel, Enjay EPT and Dutral S70 made with dicyclopentadiene, 1,4-hexadiene, methylenenorbornene and 1,5-cyclooctadiene, respectively, as the third monomer.

The polymers are made by direct polymerization of ethylene, propylene and a diene monomer using conventional solution polymerization techniques with vanadium salts and aluminum alkyls as coordination catalysts as described in the patents listed above.

A mixture of ethylene and propylene in about equimolecular proportions in the terpolymer gives rubber-like material. As the proportion of ethylene is increased, plasticity of the product is lowered. Higher than 80% by weight of ethylene in the product gives an undesirable material.

In a typical preparation of a terpolymer of ethylene, propylene and 1,4-hexadiene, a catalyst mixture is prepared by heating a 25% by weight solution of 0.075 mol aluminum triisobutyl and 0.33 mol of decene-1 in tetrachloroethylene to boiling under reflux and nitrogen to form aluminum tridecyl. Aluminum chloride (0.038 mol) is dissolved in the product solution under nitrogen at 100° C. and the mixture is cooled to room temperature. One hundred milliliters of this cooled solution is added to 0.005 mol of vanadyl trichloride in 2 liters of tetrachloroethylene in a polymerization vessel. An ethylene-propylene feed containing 75 mol percent propylene is introduced at 2 liters per minute into catalyst solution. Simultaneously, 0.20 mol of 1,4-hexadiene in 90 ml. of tetrachloroethylene is added. Remaining diene solution is added dropwise continuously as polymerization proceeds. After 2 minutes of polymerization the ethylene-propylene feed is changed to 50 mol percent polypropylene. Temperature is maintained at 30° C. for the 2 hour polymerization period. Terpolymer is isolated from solution by precipitation with n-butanol. The precipitate is slurried with acetone, dried and washed. This material is extracted with benzene and terpolymer is recovered by reprecipitation, slurrying, washing and drying as just described. The elastomeric terpolymer contains 30 weight percent propylene, 2.5 weight percent diene (iodine number 7.5) and 67.5% ethylene.

Proportions of propylene, ethylene and diene are varied by changing charging ratios and/or catalyst concentration.

Ethylene-propylene-diene terpolymers high in propylene (above 55 weight percent) are found to be lacking in certain rubbery qualities such as tensile strength, hysteresis and ability to cure quickly.

Ethylene-propylene-diene terpolymers high in ethylene (above 60 weight percent) are also found to be lacking in valuable rubbery qualities. The compounded stocks are very stiff, hard, and almost impossible to tackify with resin or cements.

Example 1

A series of EPDM materials is prepared by the procedure set forth above. By varying the charging ratios of the monomers and the catalyst concentrations as is taught in the art, terpolymers are obtained which contain a range of ethylene and propylene in percent by weight as set forth below.

| | Weight percent Propylene | Weight percent Diene | Dilute Solution Viscosity (DSV) |
|---|---|---|---|
| Terpolymer: | | | |
| A | 67 | 2.6 | 1.6 |
| B | 60 | 5.8 | 1.6 |
| C | 56 | 5.5 | 1.6 |
| D | 44 | 3.0 | 2.3 |
| E | 41 | 4.1 | 1.9 |
| F | 30 | 2.5 | 1.8 |
| G | 22 | 3.0 | 1.9 |

Terpolymers A, B, and C are considered to have high amounts of propylene; D has a normal amount; E, F and G have low amounts of propylene.

Polymers from each of the high, normal and low levels of propylene groups and blends of the polymers are compounded according to the following recipe for testing and evaluation as tire building stocks. The materials are mixed on rubber mills and samples are cured 1 hour at 300° F.

Material: Parts
Polymer or blend of polymers _____ 100
Carbon black _____ 80
Zinc oxide _____ 5
Stearic acid _____ 1
Naphthenic process oil _____ 20–35
Low molecular weight polybutene (1000–5000) _____ 15–20
Non-heat reactive phenolformaldehyde resin _ 5–10
Tetramethyl thiuram disulfide _____ 1.25
Mercaptobenzothiazole _____ 0.75
Sulfur _____ 1.5

Data are set forth in Table 1.

TABLE I

| | Stock 1 | Stock 2 | Stock 3 | Stock 4 | Stock 5 | Stock 6 |
|---|---|---|---|---|---|---|
| High propylene | B100 | | | C30 | C50 | A70 |
| Normal propylene | | D100 | | | | |
| Low propylene | | | G100 | E70 | F50 | E30 |
| Wt. percent propylene in blend | 60 | 44 | 22 | C=56; E=41 | C=56; F=30 | A=67; E=41 |
| Properties: | | | | | | |
| Green Strength: | | | | | | |
| $T_B - T_Y$ (p.s.i.) | −80 | −50 | +350 | +24 | +6 | +3 |
| Ultimate elongation | 450 | 790 | 780 | 1,070 | 1,030 | 870 |
| Tack: Hand tack | Good | Poor | Poor | Good | Very good | Very good |
| Tire building potential | Poor | do | do | do | Good | Good |

In Table 1 the rating for Tire Building Potential is explained as follows: Stock 1 has negative green strength even though elongation and hand tack are satisfactory. Stock 2 has adequate elongation, but negative green strength and poor tack. Stock 3 has adequate elongation, too high green strength and poor tack. The excess green strength shows up on inspection in that the stock is dry and leathery and won't accept tack cements. Stocks 4, 5, and 6 all rate Good on Tire Building Potential. All have excellent elongation, good or better tack, and positive values for $T_B - T_Y$ between 1 and 100.

Example 2

The following ethylene, propylene, diene terpolymers are obtained:

| | Weight percent Propylene | Weight percent Diene | DSV |
|---|---|---|---|
| Polymer: | | | |
| H | 55 | 3.1 | 1.8 |
| I | 36 | 2.0 | 1.7 |

Fifty parts of each polymer is taken and the blend is compounded as in Example 1. The hand tack rating is good. No green strength measurements are made.

This stock is used as carcass stock in the manufacture of pneumatic tires. The stock handles well in all factory processing and calendering operations. Ten tires, 2 ply rayon, size 7.75 x 14, are built on standard building equipment. No tack cements or tacky tiegums are needed. Green tires develop no looseness in the bead area when stored 48 hours before curing. The tires cure with no problems.

We claim:

1. A composition of matter comprising a blend of (a) from 70 to 25 parts per 100 parts of blend of a terpolymer of ethylene-propylene-non-conjugated diene containing 55%–67% by weight propylene and from about 3 to about 5 weight percent diene monomer and (b) from 30 to 75 parts per 100 parts of blend of a terpolymer of ethylene - propylene - non - conjugated diene containing 50%–80% by weight ethylene and from about 3 to about 5 weight percent diene monomer.

2. The composition of matter of claim 1 wherein (a) is present in the range 70–30 parts and (b) is present in the range 30–70 parts.

3. Carcass stock for pneumatic tires comprising a blend of two ethylene-propylene-non-conjugated diene rubbers, A and B, wherein A comprises a terpolymer containing 55%–67% by weight propylene and from about 3 to about 5 weight percent diene monomer, and B comprises a terpolymer containing 20%–41% propylene and from about 3 to about 5 weight percent diene monomer, said blend comprising 70–30 parts of rubber A and 30–70 parts of rubber B, the total parts of A and B in the blend being equal to 100.

References Cited

UNITED STATES PATENTS 3,365,418  1/1968  Nyce et al. _____ 260—41.5
3,364,155  1/1968  Souffie _____ 260—4

MURRAY TILLMAN, Primary Examiner

C. J. SECURRO, Assistant Examiner

U.S. Cl. X.R.

156—334; 260—41, 844